United States Patent
Courtois

(10) Patent No.: US 8,517,602 B2
(45) Date of Patent: Aug. 27, 2013

(54) METHOD AND APPARATUS FOR RAPID TEMPERATURE MEASUREMENT

(75) Inventor: Christian Courtois, Tournan En Brie (FR)

(73) Assignee: Renishaw PLC, Wotton-Under-Edge (GB)

( * ) Notice: Subject to any disclaimer, the term of this patent is extended or adjusted under 35 U.S.C. 154(b) by 589 days.

(21) Appl. No.: 12/451,127

(22) PCT Filed: Apr. 28, 2008

(86) PCT No.: PCT/GB2008/001467
§ 371 (c)(1),
(2), (4) Date: Oct. 27, 2009

(87) PCT Pub. No.: WO2008/135717
PCT Pub. Date: Nov. 13, 2008

(65) Prior Publication Data
US 2010/0118913 A1    May 13, 2010

(30) Foreign Application Priority Data
May 3, 2007    (EP) ..................... 07356061

(51) Int. Cl.
*G01K 3/00*    (2006.01)
*G01K 15/00*    (2006.01)
*G01K 7/00*    (2006.01)

(52) U.S. Cl.
USPC ............ 374/112; 374/110; 374/1; 374/137; 374/166

(58) Field of Classification Search
USPC ............... 374/112, 137, 166, 1, 110
See application file for complete search history.

(56) References Cited

U.S. PATENT DOCUMENTS

| | | | | |
|---|---|---|---|---|
| 4,444,990 A * | 4/1984 | Villar | ........................... | 136/221 |
| 5,015,102 A * | 5/1991 | Yamaguchi | ................... | 374/107 |
| 5,195,826 A | 3/1993 | Enderle et al. | | |
| 5,259,389 A * | 11/1993 | Muramoto et al. | .......... | 600/546 |
| 5,473,629 A * | 12/1995 | Muramoto | ................... | 374/102 |
| 5,632,555 A * | 5/1997 | Gregory et al. | ............... | 374/102 |
| 6,439,768 B1 | 8/2002 | Wu et al. | | |
| 7,318,004 B2 * | 1/2008 | Butterfield | .................... | 702/130 |
| 7,637,657 B2 * | 12/2009 | Yamamoto et al. | ........... | 374/169 |
| 8,025,438 B2 * | 9/2011 | Nakamura et al. | ............ | 374/169 |
| 8,047,712 B1 * | 11/2011 | Sturner et al. | ................ | 374/152 |
| 2002/0003832 A1 * | 1/2002 | Siefert | ......................... | 374/169 |
| 2007/0284430 A1 * | 12/2007 | Rock | ............................ | 235/375 |
| 2009/0116535 A1 * | 5/2009 | Rund | ............................ | 374/102 |
| 2009/0129433 A1 * | 5/2009 | Zhang et al. | .................. | 374/102 |

FOREIGN PATENT DOCUMENTS

| | | |
|---|---|---|
| EP | 0 482 562 B1 | 5/1996 |
| EP | 1 988 374 A1 | 11/2008 |
| WO | WO 97/03340 A1 | 1/1997 |

* cited by examiner

*Primary Examiner* — Mirellys Jagan
(74) *Attorney, Agent, or Firm* — Oliff & Berridge, PLC

(57) ABSTRACT

A method of using a temperature sensor to determine the temperature of an object is described. The method comprises bringing the temperature sensor into thermal contact with the object to be measured. The temperature sensor is then used to acquire a plurality of temperature readings, the plurality of temperature readings being acquired prior to the temperature sensor reaching thermal equilibrium with the object. At least some of the plurality of temperature readings are then used to determine a pseudo-stable temperature at which the rate of change of temperature readings with time is less than a predetermined rate. The actual temperature of the object may then be predicted from the pseudo-stable temperature.

15 Claims, 3 Drawing Sheets

METHOD AND APPARATUS FOR RAPID TEMPERATURE MEASUREMENT

BACKGROUND

The present invention relates to a method and apparatus for rapid temperature measurement and in particular to a method of operating a temperature measurement probe to rapidly acquire the temperature of a workpiece on co-ordinate positioning apparatus.

It is known that when a temperature sensor is brought into contact with an object, such as a workpiece, it will take a certain amount of time for the temperature sensor to reach the temperature of the object. For applications where the speed of temperature measurement is not critical, it is known to simply keep the temperature sensor in contact with the object for enough time for thermal equilibrium to be reached.

For certain applications it is, however, desirable to measure the temperature of an object rapidly. This is especially the case when measuring the temperature of workpieces or other objects being produced or inspected in an automated production facility. An extrapolation technique for predicting the temperature of a workpiece on a co-ordinate measuring machine has been described previously in U.S. Pat. No. 5,195,826. The method involves providing a temperature sensing probe that includes a switch for sensing when the temperature sensor makes initial contact with the workpiece. Temperature data are then collected for a certain period of time after the initial workpiece contact. A numerical technique is used to extrapolate the temperature data curve to provide an estimate of the equilibrium temperature value.

The technique of U.S. Pat. No. 5,195,826 has the disadvantage of being relatively complex. In particular, the method can be difficult to implement practically because it relies on knowledge of the precise shape of temperature response curve and also the time of initial workpiece contact. The amount of data processing required to provide the numerical prediction can also be prohibitive.

In the medical field, electronic clinical thermometers are known in which an equilibrium body temperature is established using a predictive technique. EP482562, for example, describes a technique for determining body temperature in which collected temperature data are fitted to an equation that allows an equilibrium temperature to be predicted. The equilibrium temperature prediction is continually updated as more temperature data are collected until the temperature prediction is found to be sufficiently accurate. In EP482562, the temperature prediction is held to be sufficiently accurate when the rate of change of the measured temperature values with time drops below a certain predetermined value and when the change in predicted equilibrium temperature with time drops below a certain predetermined value.

SUMMARY

According to a first aspect of the invention, a method of using a temperature sensor to determine the temperature of an object is described, the method comprising the steps of;
(i) bringing the temperature sensor into thermal contact with the object to be measured;
(ii) using the temperature sensor to acquire a plurality of temperature readings, said plurality of temperature readings being acquired prior to the temperature sensor reaching thermal equilibrium with the object; and
(iii) using at least some of the plurality of temperature readings of step (ii) to determine a pseudo-stable temperature at which the rate of change of temperature readings with time is less than a predetermined rate.

The present invention thus provides a method for determining the temperature of an object in which a temperature sensor is brought into contact with an object to be measured, such as a part or workpiece. As outlined in more detail below, the temperature sensor and object are typically at quite different temperature before thermal contact is established. The initial rate at which the temperature of the sensor changes is thus very rapid, but this rate decreases as thermal equilibrium is approached. Even if the temperature sensor has a very low thermal mass, it can still take several minutes for true thermal equilibrium with the object to be reached.

The method of the present invention comprises taking a series of temperature readings or measurements whilst the temperature sensor is being heated, or cooled, by the object. A pseudo-stable temperature can then be found from these reading; the pseudo-stable temperature being a temperature at which the rate of change of the sensor temperature with time is lower than a certain (predetermined) rate. It should be noted that the temperature sensor may initially be hotter or colder than the object; the rate of change of temperature readings thus refers only to the magnitude (and not the sign) of such temperature changes. For a low thermal mass temperature sensor, a suitable pseudo-stable temperature can typically be found within only a few seconds of contact. Such a pseudo-stable temperature can then be used, as described in more detail below, as the basis for accurately predicting the true temperature of the object.

The present invention thus permits the temperature of an object to be predicted within a short time of a temperature sensor making contact with an object. Furthermore, the method of the present invention has the advantage of not requiring the use of complicated temperature extrapolation or prediction techniques of the type described previously in U.S. Pat. No. 5,195,826 and EP482562. As explained in more detail below, a simple look-up table is all that is required to find the object temperature from the pseudo-stable temperature. A further advantage of the present invention over U.S. Pat. No. 5,195,826 is that the time of contact between the temperature sensor and the object does not need to be measured. The present invention thus negates the need to furnish temperature sensors with any kind of contact switch to measure the instant at which thermal contact is established. It can thus be seen that the present invention mitigates many of the disadvantages associated with prior techniques of the type described in U.S. Pat. No. 5,195,826.

Advantageously, the method also comprises the step (iv) of predicting the (equilibrium) temperature of the object using the pseudo-stable temperature determined in step (iii). The prediction may conveniently comprise the step of determining a start temperature, the start temperature being the temperature of the temperature sensor prior to thermal contact being established with the object. The start temperature may be readily found from one or more temperature readings that are taken prior to the sensor being brought into contact with the object.

Once the start temperature and pseudo-stable temperature have been found, the step may be advantageously performed of determining a difference temperature ($\Delta T$) between the pseudo-stable temperature and the start temperature. For example, the start temperature may be subtracted from the pseudo-stable temperature to provide the difference temperature. It has been found that the difference temperature ($\Delta T$) is directly related to the difference between the pseudo-stable temperature and the actual temperature of the object. Step (iv) may thus advantageously comprise predicting the temperature of the object by applying a correction to the pseudo-stable temperature, wherein the applied correction depends on the difference temperature ($\Delta T$). It should, of course, be noted that if the start temperature is invariant between measurements (e.g. if the temperature sensor is heated or cooled to a certain temperature before each measurement) the correction to be applied will then depend on just the pseudo-stable temperature.

Advantageously, a look-up table may be provided that comprises a plurality of predetermined corrections for a plurality of different difference temperatures ($\Delta T$). The correction that is applied to the pseudo-stable temperature to provide a predicted object temperature may thus be conveniently determined by reference to the look-up table. The correction in the look-up table that most closely corresponds to the difference temperature may be used. Advantageously, use of the look-up table may comprise the step of taking at least two of said predetermined corrections and using an interpolation process to calculate the correction that is applied to the pseudo-stable temperature. In this manner, a correction can be calculated using a look-up table having relatively few entries.

The method may advantageously comprise an initial calibration routine for determining said look-up table. In other words, the look-up table may be populated with data relating to the difference temperature and the correction that is required to convert the pseudo-stable temperature to the actual object temperature. The initial calibration routine may thus comprise determining a start temperature, a pseudo-stable temperature and an equilibrium (actual) temperature. The object and/or sensor may be heated and/or cooled as required to provide the range of difference temperatures that are required for the look-up table. Although each measurement performed during the calibration routine may take several minutes (i.e. so the thermal equilibrium is reached), the routine can be performed once or infrequently. For example, the LUT may be calculated during manufacture and/or periodically as part of a full system calibration.

The method may comprise performing step (ii) to collect a series of temperature readings and then subsequently performing step (iii) to analyse those readings to establish a pseudo-stable temperature. For example, temperature readings may be collected for a certain period of time (e.g. 10 seconds) and then analysed to determine a pseudo-stable temperature. Advantageously, steps (ii) and (iii) are performed in parallel such that said temperature readings are monitored whilst, or shortly after, being acquired in order to determine when the pseudo-stable temperature is reached. In other words, a series of temperature readings may be monitored until a pseudo-stable temperature is found. Once the pseudo-stable temperature has been found, the sensor may be withdrawn from the object.

Advantageously, the method is performed using a temperature sensor having a low thermal mass. For example, the method may use a temperature sensor of the type described in Applicant's co-pending international patent application that claims priority from European patent application 07356060. Advantageously, the effective thermal mass of the temperature sensor is less than 0.5 g, more preferably less than 0.1 g, more preferably less than 0.05 g, and more preferably around 0.02 g or less.

The method of the present invention may be used to measure the temperature of any object. However, it is particularly advantageous when used as part of automated process. Step (i) may thus conveniently comprise using a machine (e.g. a machine tool, co-ordinate measuring machine etc) to bring a temperature probe comprising the temperature sensor into contact with the object. The rapid, accurate, temperature measurement provided by the present invention can thus increase throughput of such an automated process.

According to a second aspect of the invention, temperature sensing apparatus comprises a temperature sensor for acquiring a series of temperature readings and a processor for monitoring said series of temperature readings, wherein the processor is arranged to monitor temperature readings acquired after the sensor contacts an object and to determine when a pseudo-stable temperature is reached at which the temperature readings vary with time but at less than a predetermined rate. The processor may be also arranged to implement any of the steps of the method according to the first aspect of the invention. For example, the processor may be arranged to store or interrogate a look-up table and/or to predict the object temperature in the manner described above.

The temperature sensing apparatus may conveniently comprise a temperature measurement probe in which the temperature sensor is housed. For example, the apparatus may comprise a temperature measurement probe of the type described in Applicant's aforementioned co-pending international patent application. The temperature measurement probe is preferably sufficiently robust to withstand operation in a machine tool environment.

The processor may also be located within the measurement probe. Alternatively, the apparatus may comprise an interface for receiving, in use, temperature readings from the measurement probe. The transfer of such temperature readings may take place over a wireless communications link. The processor may then be conveniently located in the interface.

BRIEF DESCRIPTION OF THE DRAWING

The invention will now be described, by way of example only, with reference to the accompanying drawings in which.

DETAILED DESCRIPTION

Figure 1:
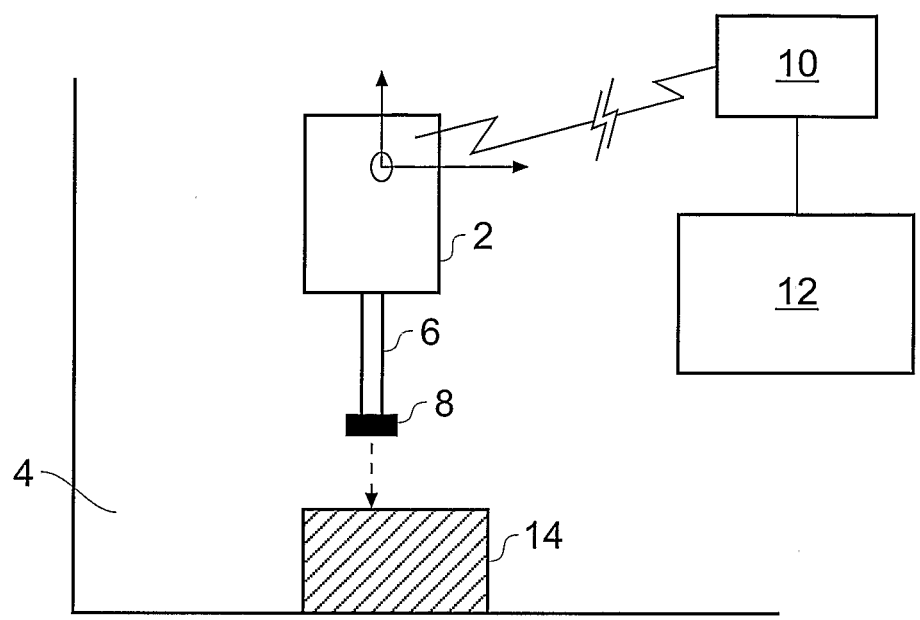
FIG. 1 shows a temperature measurement probe mounted to a machine tool.

Referring to FIG. 1 a temperature sensing probe 2 is illustrated that is moveable within the working space of a machine tool 4. The temperature sensing probe 2 comprises a stylus 6 having a temperature sensor 8 at its distal end. A wireless (RF) link can be provided to pass temperature data to an interface 10 which can then pass said data to a machine tool control system 12 which may comprise a numerical controller and computer. The machine control system 12 also controls movement of the temperature sensing probe 2 within the working space. In use, the machine tool 4 brings the temperature sensor 8 into contact with an object or workpiece 14 to be measured.

Figure 2:
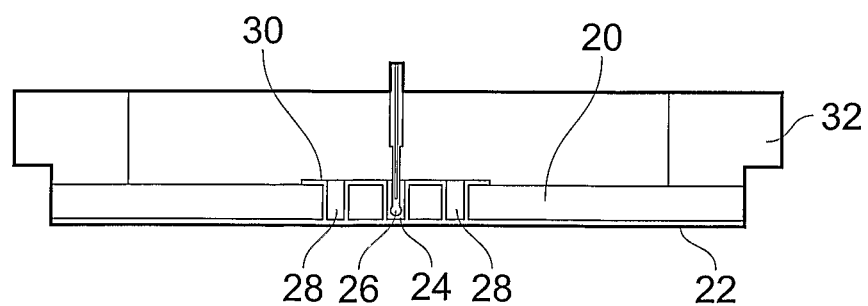
FIG. 2 is an illustration of a temperature sensor suitable for inclusion in the measurement probe of FIG. 1.

FIG. 2 illustrates the temperature sensor 8 in more detail. In particular, the temperature sensor 8 comprises a substrate 20 having an outer conductive coating 22. The substrate 20 also comprises a thermocouple via 24 in which the thermocouple hot junction 26 is located. Eight vias 28 are also provided to encircle the thermocouple via 24. A copper coating 30 is provided at the central region of the inner surface of the substrate 20 which also coats the internal surfaces of the vias 24 and 28 thereby aiding heat transfer to the sensor. A plastic ring 32 is provided for mounting the sensor substrate 20 to the head of the stylus. The electronics providing the cold junction of the thermocouple can be located in the body of the probe. A more detailed description of such a temperature sensor and the associated temperature sensing probe can be found in Applicant's co-pending international patent application that claims priority from European patent application 07356060; the contents of that application are hereby incorporated herein by reference. The temperature sensor 8 has the advantage of having a low thermal mass. However, it should be noted that any type of temperature sensor can be used with the method of the present invention.

The method of predicting temperature in accordance with the present invention will now be described with reference to FIGS. 3 to 5.

Figure 3:
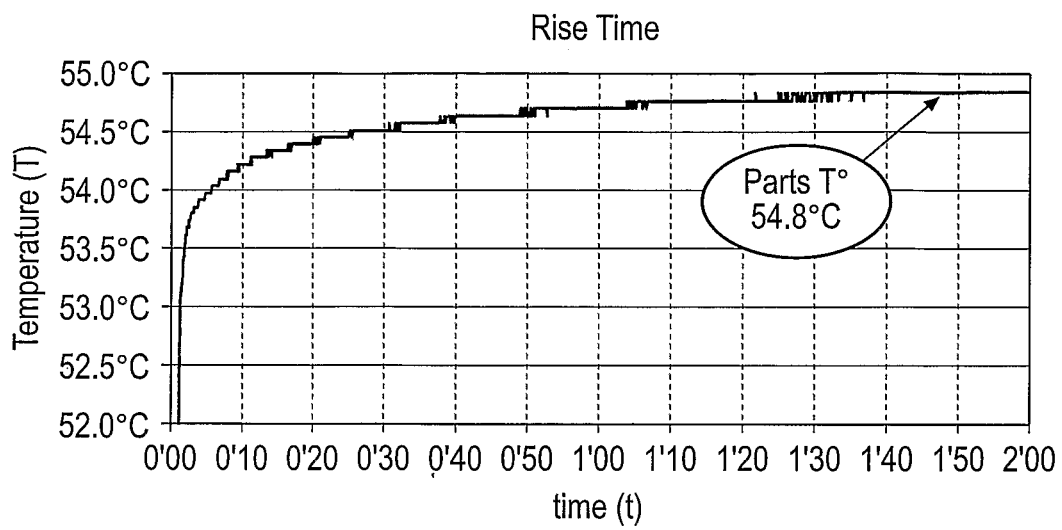
FIG. 3 shows a plot of temperate versus time when the temperature sensor of FIG. 2 is brought into contact with an object.

FIG. 3 is a plot of temperature versus time data acquired when a temperature sensor of the type described with reference to FIG. 2 is brought into contact with an object, such as a workpiece or part. It can be seen that the low thermal mass of the temperature sensor ensures that there is a very rapid rise from the initial (ambient) starting temperature to a temperature that is very close (e.g. to within a few degrees Celsius) to the actual temperature of the part. However, it can also be seen from FIG. 3 that it can still take several minutes before the temperature sensor provides a temperature reading that accurately (e.g. to within 0.1° C.) corresponds to the temperature of the part.

To predict the temperature of the part, a pseudo-stable temperature is found. This is achieved by analysing the measured temperature values or readings acquired after the sensor makes contact with the object and ascertaining when the temperature rise first falls below a certain rate.

Figure 4:
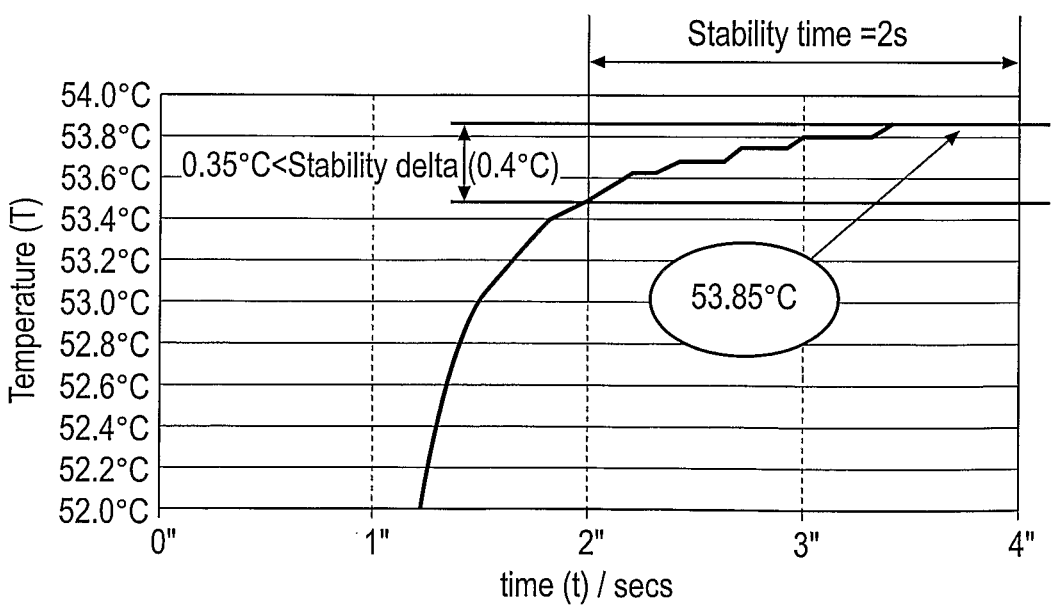
FIG. 4 is shows the pseudo-stable temperature region of the plot of FIG. 3 in more detail.

FIG. 4 plots the first four seconds of temperature data that are shown in FIG. 3. In this example, pseudo-stability is defined as being achieved when the temperature rise becomes less than 0.4° C. in any two second period of time (this is the so-called stability delta). The pseudo-stable temperature can, in this case, be seen to be 53.85° C. and this value is achieved within four seconds. It is important to note that the temperature sensor is not in thermal equilibrium with the object when the pseudo-stabile temperature is reached and would therefore continue to rise in temperature for several more minutes if thermal contact was maintained. In other words, the pseudo-stable temperature region is located on the rising edge of the temperature versus time plot outside of the thermal equilibrium region.

It has been found that the actual temperature of the object is related to the difference between the start temperature (i.e. the temperature of the temperature sensor immediately before being brought into contact with the object) and the above described pseudo-stable temperature. This temperature difference value can be termed $\Delta T$.

Figure 5:
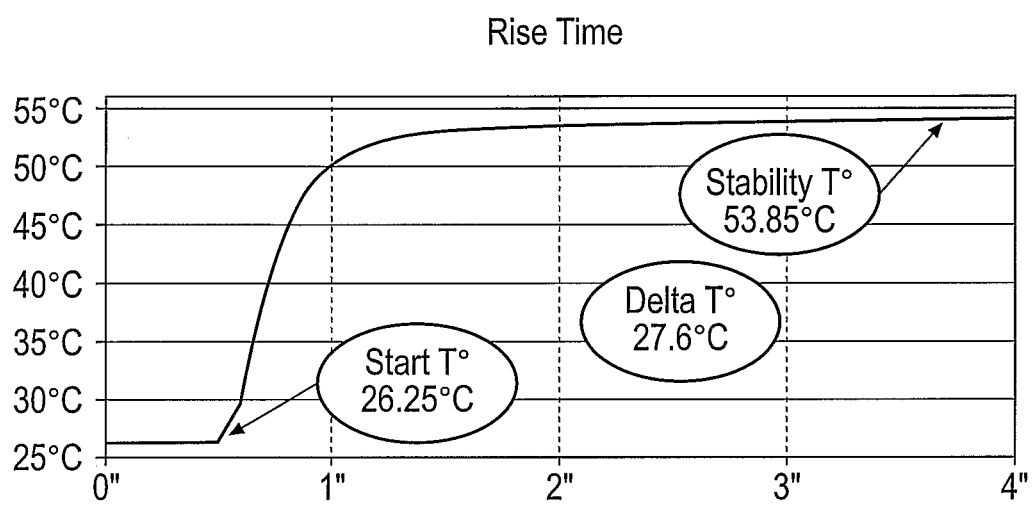
FIG. 5 is an expanded view of the data presented in FIG. 3 that shows the start and pseudo-stable temperatures.

FIG. 5 shows the first four seconds of data used in the graphs of FIGS. 3 and 4 plotted against an expanded temperature range. FIG. 5 thus shows both the start temperature of the sensor (26.25° C.) and the pseudo-stable temperature (53.85° C.) as determined in the manner described with reference to FIG. 4 above. In this example, the value of $\Delta T$ can be seen to be 27.6° C.

For a particular temperature sensor, a look-up table can be calculated that provides a correction value (C) for given values of $\Delta T$. In particular, table 1 provides an appropriate correction value (C) for the temperature sensor of the present example when using the above defined pseudo-stability region.

TABLE 1

Look-up table for temperature correction.

| $\Delta T$ | Correction (C.) |
|---|---|
| 10° C. | 0.50° C. |
| 20° C. | 0.80° C. |
| 30° C. | 1.00° C. |
| 40° C. | 1.20° C. |
| 50° C. | 1.35° C. |
| 60° C. | 1.50° C. |

The correction value (C) allows the actual temperature of an object to be found via the expression:

$$T_{est} = T_{pseudo\text{-}stab} + C \qquad (1)$$

where $T_{est}$ is the predicted temperature of the object, $T_{pseudo\text{-}stab}$ is the determined pseudo-stable temperature and C is the correction value appropriate for the calculated value of $\Delta T$.

A look-up table could be produced in which correction values (C) are provided for multiple values of $\Delta T$ across the likely range. In such a case, the closest correction value could then simply be read from the look-up table and used in equation (1) to predict the actual temperature of the object. It is also possible to use a look-up table that includes fewer entries in combination with a suitable interpolation process to provide an interpolated correction value. For example, the data contained in table 1 may be used to calculate a correction value for the above described $\Delta T$ value of 27.6° C. as follows:

$$C = \frac{[(27.6 - 20) \times 1.0 + (30 - 27.6) \times 0.8]}{10} = 0.95° \text{ C.} \qquad (2)$$

Using the correction factor of equation (2) in equation (1) can thus be seen to provide a value of $T_{est}$ of 54.8° C. It can thus be seen that the above described prediction process can find the actual temperature of the object within four second of the temperature sensor contacting the surface. Furthermore, the temperature can be seen to be estimated to a high level of accuracy (i.e. it corresponds well to the actual temperature). The prediction process is thus much quicker than waiting for two minutes or so for thermal equilibrium between the sensor and part to be reached and also provides a reliable estimate of object temperature.

Look-up tables of the type provided as table 1 can be derived during an initial temperature sensor calibration process. This calibration process would typically involve collecting data (e.g. as shown in FIG. 3) until thermal equilibrium is reached for the required values of $\Delta T$. The pseudo-stability temperature and actual (equilibrium) temperature can then be found from which the correction value (C) can be established. LUTs may be found for each individual sensor, or may be applicable to all temperature sensors of a particular design.

It should be noted that the definition of pseudo-stability may be varied according to the required measurement accuracy. For example, defining a wider stability delta (e.g. 2° C. per 2 seconds) decreases the measurement time but moves the pseudo-stable temperature further away from the actual temperature thereby reducing prediction accuracy. Conversely, defining a tighter stability delta (e.g. 0.2° C. per 2 seconds) increases the required measurement time but moves the pseudo-stable temperature closer to the actual temperature thereby increasing prediction accuracy. It can thus be seen that the method is flexible and allows a trade-off to be made between prediction accuracy and measurement time; a user can thus adapt the method as necessary for the particular application.

It should also be noted that the rise time characteristics will vary markedly with the thermal mass of the sensor. In particular, the rise time will be quicker for temperature sensors having a lower thermal mass. The use of low thermal mass sensors is preferred as it enables a certain region of pseudo-stability to be reached in a shorter time, however the method could equally be applied to any type of temperature sensor.

The invention claimed is:

1. A method of using a temperature sensor to determine the temperature of an object, comprising the steps of:
    (i) determining a start temperature, said start temperature being the temperature of the temperature sensor prior to thermal contact being established with the object;
    (ii) bringing the temperature sensor into thermal contact with the object to be measured;
    (iii) using the temperature sensor to acquire a plurality of temperature readings, said plurality of temperature readings being acquired prior to the temperature sensor reaching thermal equilibrium with the object;
    (iv) using at least some of the plurality of temperature readings of step (iii) to determine a pseudo-stable temperature at which the rate of change of temperature readings with time is less than a predetermined rate; and
    (v) determining a difference in temperature between the pseudo-stable temperature of step (iv) and the start temperature of step (i) and using said difference in temperature to predict the temperature of the object.

2. The method according to claim 1, wherein steps (iii) and (iv) are performed in parallel such that said temperature readings are monitored while being acquired to determine when the pseudo-stable temperature is reached.

3. The method according to claim 1, wherein the method is performed by a temperature sensor having a low thermal mass.

4. The method according to claim 1, wherein step (ii) comprises using a machine to bring a temperature probe comprising the temperature sensor into contact with the object.

5. The method according to claim 1, wherein step (v) comprises predicting the temperature of the object by applying a correction to the pseudo-stable temperature, wherein the applied correction depends on the difference in temperature.

6. The method according to claim 5, in which a look-up table is provided that comprises a plurality of predetermined corrections for a plurality of difference in temperatures, wherein said applied correction is determined by reference to the look-up table.

7. The method according to claim 6, further comprising taking at least two of said predetermined corrections and using an interpolation process to calculate the correction that is applied to the pseudo-stable temperature.

8. The method according to claim 6, further comprising an initial calibration routine for determining said look-up table.

9. A temperature sensing apparatus comprising a temperature sensor for acquiring a series of temperature readings and a processor for monitoring said series of temperature readings, wherein the processor is configured to:
    determine a start temperature comprising a temperature of the temperature sensor prior to thermal contact being established with an object;
    monitor the temperature readings acquired after the temperature sensor contacts the object;
    determine when a pseudo-stable temperature is reached at which the temperature readings vary with time but at less than a predetermined rate;
    determine a difference in temperature between the pseudo-stable temperature and the start temperature; and
    predict the temperature of the object using the difference in temperature.

10. The apparatus according to claim 9, wherein the processor is arranged to predict the temperature of the object by applying a correction to the pseudo-stable temperature, wherein the applied correction depends on the difference in temperature.

11. The apparatus according to claim 10, in which the apparatus stores a look-up table that comprises a plurality of predetermined corrections for a plurality of difference in temperatures, wherein said applied correction is determined by the processor by reference to the look-up table.

12. The apparatus according to claim 11, wherein the processor is arranged to take at least two of said predetermined corrections and use an interpolation process to calculate the correction that is applied to the pseudo-stable temperature.

13. The apparatus according to claim 9, further comprising a temperature measurement probe in which the temperature sensor is housed.

14. The apparatus according to claim 13, wherein the processor is also located within the measurement probe.

15. The apparatus according to claim 13, further comprising an interface, wherein the processor is located in the interface and, in use, temperature readings are passed from the measurement probe to the interface.

* * * * *